United States Patent
Carter et al.

(10) Patent No.: US 10,471,815 B2
(45) Date of Patent: Nov. 12, 2019

(54) TONNEAU COVER STRIKER ASSEMBLY

(71) Applicant: Tectum Holdings, Inc., Ann Arbor, MI (US)

(72) Inventors: Chad Carter, Manchester, MI (US); Anthony Stubbs, Belleville, MI (US)

(73) Assignee: Tectum Holdings, Inc., Ann Arbor, MI (US)

( * ) Notice: Subject to any disclaimer, the term of this patent is extended or adjusted under 35 U.S.C. 154(b) by 7 days.

(21) Appl. No.: 15/850,237

(22) Filed: Dec. 21, 2017

(65) Prior Publication Data
US 2019/0193538 A1     Jun. 27, 2019

(51) Int. Cl.
| B60J 7/19 | (2006.01) |
| B60J 7/14 | (2006.01) |
| B62D 33/03 | (2006.01) |

(52) U.S. Cl.
CPC .............. B60J 7/198 (2013.01); B60J 7/141 (2013.01); B62D 33/03 (2013.01)

(58) Field of Classification Search
CPC ... B60J 7/198; B60J 7/141; B60P 7/02; B62D 33/023; B62D 33/0273; B62D 33/03
USPC ....................... 296/100.07, 100.16
See application file for complete search history.

(56) References Cited

U.S. PATENT DOCUMENTS

| 6,076,881 | A | * | 6/2000 | Tucker | ............. | B60J 7/141 |
| | | | | | | 296/100.07 |
| 6,290,441 | B1 | * | 9/2001 | Rusu | ............. | B60P 7/0807 |
| | | | | | | 296/100.07 |
| 6,299,232 | B1 | | 10/2001 | Davis | | |
| 6,343,494 | B2 | | 2/2002 | Roos et al. | | |
| 6,361,086 | B1 | * | 3/2002 | Robbins | ............. | B60J 7/198 |
| | | | | | | 292/158 |
| 6,386,599 | B1 | | 5/2002 | Chevalier | | |
| 6,427,500 | B1 | * | 8/2002 | Weinerman | ........... | B60J 7/198 |
| | | | | | | 292/196 |
| 6,427,502 | B1 | | 8/2002 | Zagoroff | | |
| 6,702,360 | B1 | * | 3/2004 | Santos | ............. | B60J 7/1621 |
| | | | | | | 296/100.02 |
| 8,029,029 | B2 | * | 10/2011 | Terhaar | ............. | E05B 81/14 |
| | | | | | | 292/216 |

(Continued)

FOREIGN PATENT DOCUMENTS

DE    10 2012 017 515 A1    3/2014

OTHER PUBLICATIONS

German Office Action dated Feb. 12, 2019 for German Application No. 10 2018 116 573.0.

*Primary Examiner* — Gregory A Blankenship
(74) *Attorney, Agent, or Firm* — The Dobrusin Law Firm, P.C.

(57) ABSTRACT

An assembly for opening and closing a tonneau cover. The assembly having a plate; a latch in communication with the plate, the latch having a finger that is adapted to engage the tonneau cover; and a shaft that is connected to the plate at one end, and at another end, the shaft has a pin that is adapted to engage a slot defined in the latch. Application of a force on the plate in a first direction causes the plate to move in the first direction, which causes the latch to move in a second direction so that the tonneau cover is moved into a closed configuration. Removal of the force from the plate causes the plate to move in a third direction, which causes the latch to move in a fourth direction so that the tonneau cover is moved into an open configuration.

20 Claims, 4 Drawing Sheets

(56) References Cited

U.S. PATENT DOCUMENTS

| | | |
|---|---|---|
| 8,250,889 B2 | 8/2012 | Zagoroff |
| 2001/0020792 A1 | 9/2001 | Huotari |
| 2002/0063438 A1 | 5/2002 | Rusu |
| 2005/0264024 A1 | 12/2005 | Mulder et al. |
| 2008/0111390 A1* | 5/2008 | Smith .................. B62D 33/033 296/50 |
| 2011/0175375 A1* | 7/2011 | Terhaar .................. E05B 81/14 292/220 |
| 2018/0297457 A1* | 10/2018 | Spencer .................. B60J 7/198 |

\* cited by examiner

TONNEAU COVER STRIKER ASSEMBLY

FIELD

These teachings relate to an assembly that is adapted to open and close a tonneau cover.

BACKGROUND

A tonneau cover is a cover that is placed over the cargo box of a vehicle, and is adapted to protect against dirt, debris, water, and other contaminants from entering the inside of the cargo box.

The tonneau cover can be moved between an open configuration and a closed configuration. When the tonneau cover is in the open configuration, the tonneau cover is typically spaced apart from the top edge of at least a portion of the cargo box and/or tailgate. When the tonneau cover is in the closed configuration, the tonneau cover typically rests on the top edge the cargo box and/or tailgate.

When the tonneau cover is in the closed configuration, opening or lowering the tailgate may be hindered by the tonneau cover resting on the top edge of the tailgate. In other words, the weight or position of the tonneau cover relative to the top edge of the tailgate may create or increase friction between the tailgate and tonneau cover, which may cause the tailgate to contact, drag, and/or stick to the tonneau cover when opening or lowering the tailgate.

Similarly, when the tonneau cover is in the closed configuration, closing or raising the tailgate may be hindered by the tonneau cover. In other words, the position of the tonneau cover when in the closed configuration relative to the top edge of tailgate may create an obstruction or increase friction between the tailgate and the tonneau cover, which may cause the tailgate to contact, drag, and/or or stick to the tonneau cover when closing or raising the tailgate.

In addition to requiring additional force to open and/or close the tailgate when the tonneau cover is in the closed configuration, the contact, dragging, and/or sticking of the tailgate against the tonneau cover may also undesirably scratch the top edge of the tailgate and/or the lower or inside surface of the tonneau cover. The contact, dragging, and/or or sticking may also undesirably cause seals or surfaces of the tonneau cover and/or tailgate to wear, which may undesirably allow for dirt, debris, water, and other contaminants to enter the cargo box.

Some pickup truck platforms provide a mechanism for automatically opening and closing a tailgate. However, if the friction, contact, dragging, and/or or sticking between the tonneau cover and the tailgate is greater than the force that the mechanism is adapted to apply on the tailgate to open or close the tailgate, the mechanism will be unable to function as intended to open and/or close the tailgate when the tonneau cover is in the closed configuration.

Accordingly, it may be desirable to have an assembly that is adapted to reduce or eliminate the friction, contact, drag, and/or or sticking between the tonneau cover and a tailgate when opening or lowering the tailgate when the tonneau cover is in the closed configuration. Such an assembly would advantageously provide for opening or lowering the tailgate with lower a force and/or prevent damage to either or both of the tonneau cover and tailgate.

For example, it may be desirable to have an assembly that is adapted to reduce or eliminate the friction, contact, drag, and/or or sticking between the tonneau cover and a tailgate when closing or raising the tailgate. This may provide for closing or raising the tailgate with lower a force and/or prevent damage to either or both of the tonneau cover and tailgate.

It may also be desirable to have an assembly that is adapted to close or lock a tonneau cover when the tailgate is closed or raised. It may further be desirable have an assembly that is adapted to open or unlock a tonneau cover when the tailgate is opened or lowered.

SUMMARY

These teachings provide an assembly that is adapted to reduce or eliminate the friction, contact, drag, and/or or sticking between the tonneau cover and a tailgate when opening or lowering the tailgate when the tonneau cover is in the closed configuration. Such an assembly advantageously provides for opening or lowering the tailgate with lower a force and/or prevent damage to either or both of the tonneau cover and tailgate.

These teachings provide an assembly that is adapted to reduce or eliminate the friction, contact, drag, and/or or sticking between the tonneau cover and a tailgate when closing or raising the tailgate. This provides for closing or raising the tailgate with lower a force and/or prevent damage to either or both of the tonneau cover and tailgate.

These teachings provide an assembly that is adapted to close or lock a tonneau cover when the tailgate is closed or raised. These teachings provide an assembly that is adapted to open or unlock a tonneau cover when the tailgate is opened or lowered.

These teachings provide an assembly for opening and closing a tonneau cover. The assembly having a plate; a latch in communication with the plate, the latch having a finger that is adapted to engage the tonneau cover; and a shaft that is connected to the plate at one end, and at another end, the shaft has a pin that is adapted to engage a slot defined in the latch. Application of a force on the plate in a first direction causes the plate to move in the first direction, which causes the latch to move in a second direction so that the tonneau cover is moved into a closed configuration. Removal of the force from the plate causes the plate to move in a third direction, which causes the latch to move in a fourth direction so that the tonneau cover is moved into an open configuration.

An assembly for opening and closing a tonneau cover is provided. The assembly comprises: a plate; a latch in communication with the plate. The latch comprises a housing having an opening defined by opposing walls, the latch comprises opposing slots that are each defined in one of the opposing walls, the latch comprises a finger extending from a top of the housing that is adapted to engage the tonneau cover. The assembly comprises a shaft that is connected to the plate at one end, and at another end, the shaft comprises a pin that is adapted to engage the slots defined in the latch, each of the slots extend along an axis that is angled relative to an axis along which the shaft extends, the shaft is received through the opening in the latch. The assembly comprises a spring that is engaged by the shaft. Application of a force on the plate in a first direction causes the plate and the shaft to move in the first direction, which causes the latch to move in a second direction so that the tonneau cover is moved into a closed configuration. Movement of the shaft in the first direction causes the spring to compress. Removal of the force from the plate causes the spring to uncompress, which causes the plate to move in a third direction, which causes the latch to move in a fourth direction so that the tonneau cover is moved into an open configuration.

An assembly comprising: a plate; and a latch in communication with the plate, the latch is adapted to engage a tonneau cover. Movement of the plate in a first direction causes the latch to move in a second direction, which causes the tonneau cover to move.

DETAILED DESCRIPTION

Figure 1:
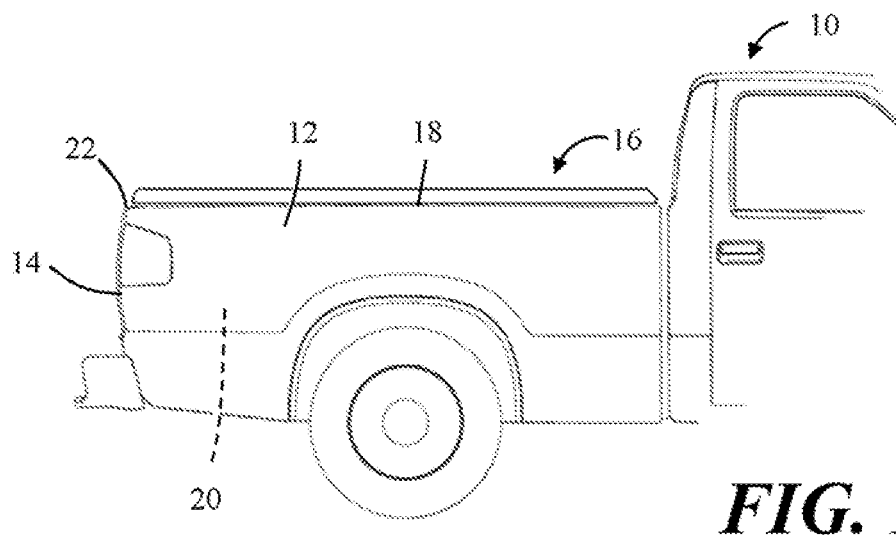
FIG. 1 is a side view of a vehicle and a tonneau cover where both the tailgate of the vehicle and the tonneau cover are illustrated in a closed configuration.

The tonneau cover may be a cover that functions to protect against dirt, debris, water, and/or other contaminants from entering an inside of the cargo box. The tonneau cover may be a cover that functions to conceal the inside of the cargo box and/or any contents inside the cargo box. The tonneau cover may be placed over the cargo bed of a vehicle, such as a pickup truck.

The tonneau cover may be a cover that comprises multiple enclosure panels. One or more of the panels can be moved or repositioned relative to one another to move the tonneau cover between an open configuration and a closed configuration. One or more of the panels may be substantially rigid. One or more of the panels may be substantially flexible, but stabilized with a rigid frame. In some configurations, the tonneau cover may be a single panel cover. The single panel can be raised or pivoted relative to the walls or top edges of the cargo box and/or tailgate to reposition the tonneau cover between an open configuration and a closed configuration.

The closed or lowered configuration of the tonneau cover may be when the tonneau cover, or at least one enclosure panel of the tonneau cover, engages, is in contact with, or rests on top of: the tailgate, a top edge or top surface of the tailgate, the walls of the cargo bed, a top edge or top surface of one or more walls of the cargo bed, or a combination thereof.

The open or raised configuration of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The open or raised configuration of the tonneau cover may be when the tonneau cover, or at least one enclosure panel of the tonneau cover, is in contact with, engages, or rests on the tailgate, a top edge or top surface of the tailgate, a top engage or top surface of the one or more walls of the cargo bed, or a combination thereof, but applies less force or pressure thereon compared to when the tonneau cover is in the closed or lowered configuration.

The vehicle, the tonneau cover, or both may comprise one or more striker assemblies. Alternatively, the one or more striker assemblies may be a stand-alone component or assembly that is obtainable and/or installed with or on the tonneau cover and/or vehicle via a retro-fit or aftermarket application.

The one or more striker assemblies may be may be adapted to at least partially move, displace, open, raise, pop-open, or separate the tonneau cover away from the top edge or surface of the tailgate and/or the top edge or surface of the cargo box. That is, as the tailgate begins to be lowered or drawn down into an open configuration, the one or more striker assemblies may be adapted to simultaneously or contemporaneously at least partially move, displace, open, raise, pop-open, or separate at least a portion of the tonneau cover away from the top edge of the tailgate and/or the top edge of the cargo box. Doing so may advantageously reduce or eliminate friction, contact, drag, and/or or sticking between the tonneau cover and the tailgate while the tailgate is being opened or lowered. This may advantageously provide for opening or lowering the tailgate with lower a force and/or prevent scratching or other damage to either or both of the inside surface of the tonneau cover and tailgate.

The one or more striker assemblies may be adapted to at least partially move, displace, open, raise, pop-open, or separate at least a portion of the tonneau cover away from the top edge of the tailgate and/or the top edge of the cargo box immediately before the tailgate begins to be lowered or drawn down into the open configuration, for example, when the tailgate latch or handle is manipulated, but before the tailgate is actually moved. Alternatively, the one or more striker assemblies may be adapted to at least partially move, displace, open, raise, pop-open, or separate at least a portion of the tonneau cover away from the top edge of the tailgate and/or the top edge of the cargo box immediately after the tailgate begins to be lowered or drawn down into the open configuration.

The one or more striker assemblies may be adapted to at least partially move, close, lower, pull-down, or draw the tonneau cover towards the top edge of the tailgate and/or the top edge of the cargo box after the tailgate is moved into the closed or raised configuration. Alternatively, as the tailgate begins to be raised or pushed up into the closed configuration, the striker assembly may be adapted to at least partially move, close, lower, pull-down, or draw at least a portion of the tonneau cover towards the top edge of the tailgate and/or the top edge of the cargo box. Alternatively, the one or more striker assemblies may be adapted to at least partially move, close, lower, pull-down, or draw at least a portion of the tonneau cover towards the top edge of the tailgate and/or the top edge of the cargo box immediately before the tailgate is in moved into the final raised or closed configuration. Alternatively, the one or more striker assemblies may be adapted to move the tonneau cover into the closed configuration at substantially the same time that the tailgate is moved into the raised or closed configuration. Moving the tailgate into the closed configuration according to any one of the aforementioned sequences may advantageously reduce or eliminate friction, contact, drag, and/or or sticking between the tonneau cover and the tailgate while the tailgate is being closed or raised. This may advantageously provide for closing or raising the tailgate with lower a force and/or prevent scratching or other damage to either or both of the inside surface of the tonneau cover and tailgate.

The one or more striker assemblies may be located, contained within, or positioned. inside a fender defining the cargo box of the vehicle. Locating the one or more striker assemblies inside a fender may be advantageous in that space inside the cargo box is not taken up by the one or more striker assemblies and/or chances of damaging the one or more striker assemblies by loading and unloading items in the cargo box may be reduced.

The one or more striker assemblies may be located or positioned on an inside fender wall defining the cargo box. This means that the striker assembly may be located on an exterior surface of the fender or wall and extend into a foot print of the cargo box. Locating the one or more striker assemblies on an inside fender wall defining the cargo box may advantageously provide for easy installation and/or service.

One or more striker assemblies may be located on or inside one fender (i.e., either the driver or passenger side fender), or on or inside two fenders (i.e., both driver and passenger side fenders).

The striker assembly may comprise one or more fingers. The one or more fingers may be configured to engage, or be connected to, or attached to, any suitable portion of the tonneau cover. For example, the finger may be adapted to engage or connect to a supporting rail or connector that extends on an underside or top side of the tonneau cover (in a cross-car vehicle direction and/or a fore-aft vehicle direction); a top side of the tonneau cover (e.g., an A-surface of the cover); a side or edge of the tonneau cover; etc. The latch and/or finger may be made from a plastic material that is generally rigid, or a plastic material that is at least partially flexible, The latch and/or finger may be made from a material that is a metal that as memory (shape memory) so that if the latch and/or finger are moved or flexed to engage or disengage the striker assembly, the latch and/or finger moves back to its pre-moved or pre-flexed position.

The elongated member comprises a second bore that is configured to engage the pin connected to rod. The elongated member may comprise more than one of these bores to allow for adjusting or accolading a position of the rod and pin relative to the slots in the housing. This may advantageously allow to take up manufacturing and/or assembly tolerance variations, and/or provide a striker assembly that can be installed in the vehicle at various locations relative to the tailgate (fore-aft direction) depending on the specific vehicle application.

The striker assembly comprises a rod that is configured to connect the elongated member and the plate. The rod may be configured to engage one or more bores (second bores) of the elongated member. By providing multiple (second) bores, a distance between the plate and the housing can be customized.

In some configurations, the rod can be eliminated, and instead the plate can be connected directly to the elongated member. This may be advantageous in order to save material costs and weight, complexity, or a combination thereof.

One or more of the place, the rod, and the elongated member may be combined into a single, common element. This may advantageously reduce part or component count.

FIG. 1 illustrates a vehicle 10. The vehicle comprises a cargo box 12 and a tailgate 14. The tailgate 14 is in the closed or raised configuration, where the tailgate 14 is at or near a vertical, upright position relative to the ground.

A tonneau cover 16 is placed onto a top edge 18 of the cargo box 12. The tonneau cover 16 may be adapted to protect against dirt, debris, water, and/or other contaminants from entering an inside 20 of the cargo box 12. The tonneau cover 16 is illustrated in the closed or lowered configuration. When tonneau cover 16 is in the closed or lowered configuration, the tonneau cover 16 is in contact with or at least partially covers a top edge 18 of the cargo box 12, and/or in contact with or covers a portion of a top edge 22 of the tailgate 14.

Figure 2:
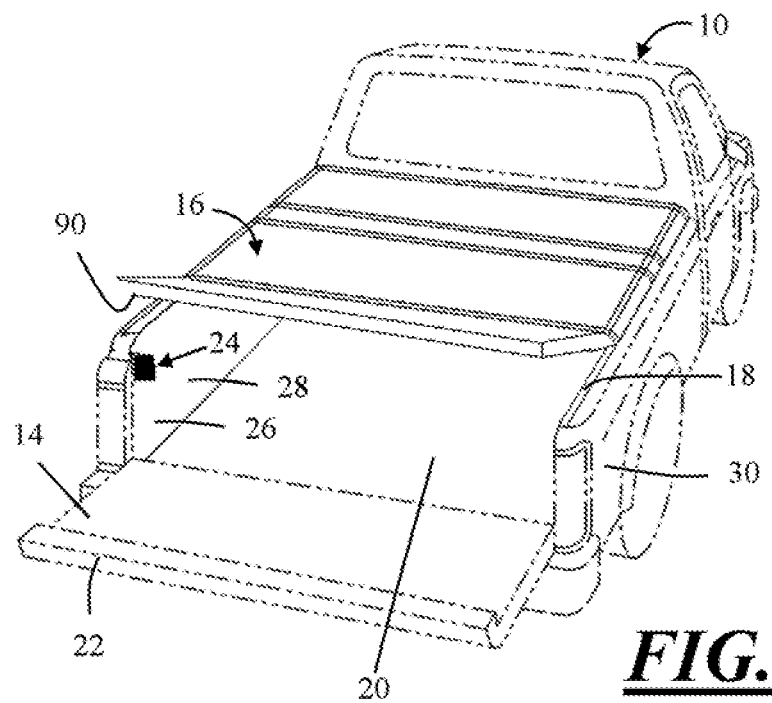
FIG. 2 is a rear perspective view of a vehicle and a tonneau cover where both the tailgate of the vehicle and the tonneau cover are illustrated in an open configuration.

FIG. 2 illustrates the vehicle 10 with the tailgate 14 in an opened or lowered configuration, and the tonneau cover 16 in a partially open or raised configuration. The opened or lowered configuration of the tailgate 14 is when the tailgate 14 is moved out of the vertical or upright position. When tonneau cover 16 is in the opened or raised configuration, the tonneau cover 16 is at least partially spaced apart from or out of contact with the top edge 18 of the cargo box 12, and/or the top edge 22 of the tailgate 14.

A striker assembly 24 is located inside the cargo box 12. The striker assembly 24 may be located, contained within, or positioned inside a fender 26 defining the cargo box 12. Alternatively, the striker assembly 24 may be attached to an inside panel 28 of the fender 26 such that the striker assembly 24 at least partially extends into the inside 20 of the cargo box 12.

While the striker assembly 24 is illustrated in FIG. 2 as being located on only one side of the cargo box 12 and described as being located within fender 26 or attached to the panel 28 of fender 26, the striker assembly 24 may instead be located within or inside an opposing fender 30 of the cargo box 12, or attached to a panel of the fender 30 such that the striker assembly 24 at least partially extends into the inside 20 of the cargo box 12.

In some other configurations, there may be two or more striker assemblies 24. in such a configuration, one or more striker assemblies 24 may be located within or inside fender 26 or attached to the panel 28 and/or one or more striker assemblies 24 may be located within or inside fender 30 or attached to a panel thereof.

As will be discussed further below, the striker assembly 24 is adapted to at least partially move, open, raise, pop-open, or separate the tonneau cover 16 away from the top edge 22 of the tailgate 14 and/or the top edge 18 of the cargo box 12 when the tailgate 14 is opened or lowered or begins to be opened or lowered. That is, as the tailgate 14 is lowered or opened, or begins to be lowered or drawn down into the open configuration, for example, when the latch of the tailgate 14 is manipulated to unlatch the tailgate 14 and/or when pressure applied on the striker assembly 24 is lowered or reduced compared to when the tailgate 14 is in the closed or raised or vertical position, the striker assembly 24 is adapted to at least partially move, open, raise, pop-open, or separate at least a portion of the tonneau cover 16 away from the top edge 22 of the tailgate 14 and/or the top edge 18 of the cargo box 12. Doing so may advantageously reduce or eliminate friction, contact, drag, and/or or sticking between the tonneau cover 16 and the tailgate 14 while the tailgate 14 is being opened or lowered, This may advantageously provide for opening or lowering the tailgate 14 with lower a force and/or prevent scratching or other damage to either or both of the inside surface 90 of the tonneau cover 16 and tailgate 14.

The striker assembly 24 is also adapted to at least partially move, close, lower, pull-down, or draw the tonneau cover 16 towards or onto the top edge 22 of the tailgate 14 and/or the top edge 18 of the cargo box 12 when the tailgate 14 is closed or raised. That is, as the tailgate 14 begins to be raised or pushed up into the closed configuration, the striker assembly 24 is adapted to at least partially move, close, lower, pull-down, or draw at least a portion of the tonneau cover 16 towards and/or into contact with the top edge 22 of the tailgate 14 and/or the top edge 18 of the cargo box 12. Doing so may advantageously reduce or eliminate friction, contact, drag, and/or or sticking between the tonneau cover 16 and the tailgate 14 while the tailgate 14 is being closed or raised. This may advantageously provide for closing or raising the tailgate 14 with lower a force and/or prevent scratching or other damage to either or both of the inside surface 90 of the tonneau cover 16 and tailgate 14.

Figure 3A:
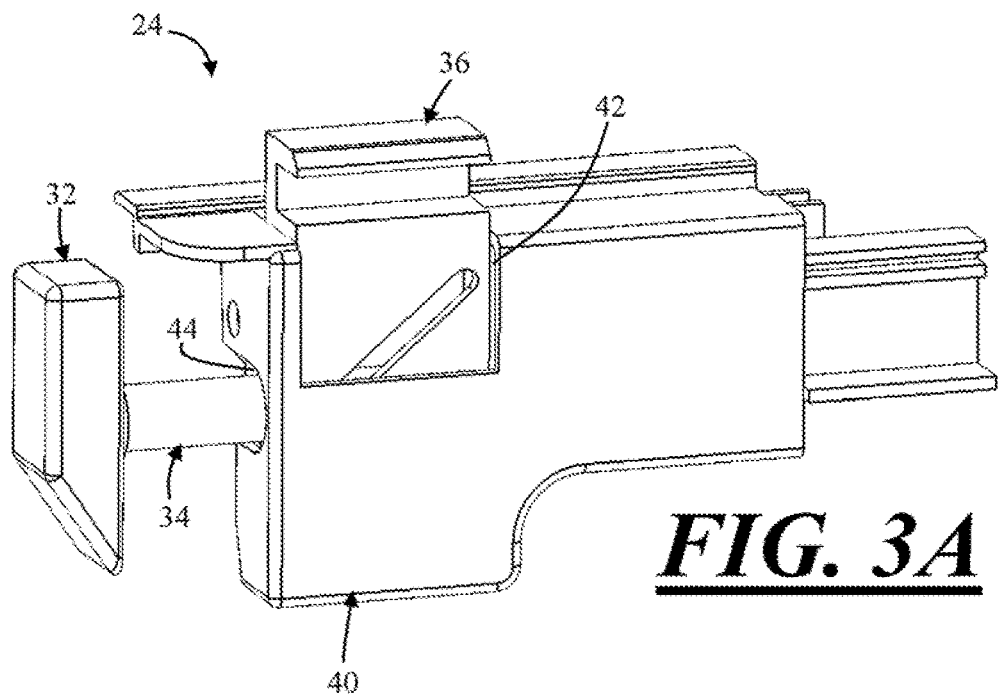
FIG. 3A is a perspective view of the striker assembly.

FIG. 3A illustrates the striker assembly 24. The striker assembly 24 generally comprises a plate 32, a shaft 34, a latch 36, a compression spring 38 (FIG. 3B), and a cover 40. The latch 36 extends through an aperture 42 defined in the cover 40, and the shaft 34 extends through another aperture 44 defined in the cover 40.

The cover 40 may be optional. In other words, the striker assembly 24 does not necessarily require the cover 40 for the assembly 24 to function as described herein.

In some configurations, for example when the striker assembly 24 is located within or inside a fender 26, 30 (FIG. 2), the cover may be the fender 26, 30 and the opening 42 in the cover 40 may be a stake hole defined in the top edge 18 of the cargo box 12. Such a placement of the striker assembly 24 in the fender 26, 30 may be advantageous because the striker assembly 24 is protected by the corresponding panel of the fender 28, 30, and does not extend into or occupy space inside 20 the cargo box 12.

Figure 3B:
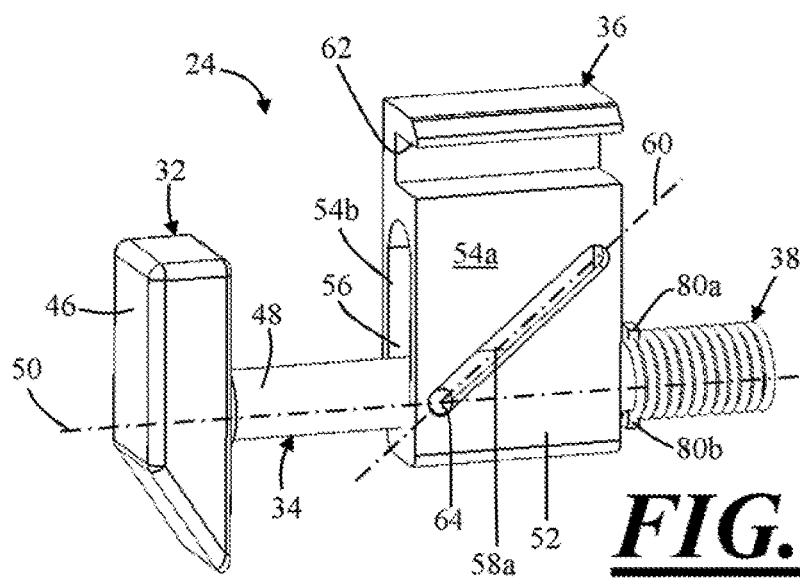
FIG. 3B is a perspective view of the striker assembly with the cover removed.

FIG. 3B illustrates the striker assembly 24 with the cover 40 removed.

The plate 32 comprises a face or surface 46 upon which a force or pressure can be acted on or removed from for the assembly 24 to function, as will discussed further below.

The shaft 34 comprises an elongated member 48 that extends along a longitudinal axis 50. The shaft 34 comprises a pin 64 that is adapted to engage slots 58*a*, 58*b* defined in the housing 52 of the latch 36, discussed below. The shaft 34 comprises retaining tabs 80*a*, 80*b* that are adapted to engage the spring 38 and maintain contact and/or connection between the shaft and spring. While a cross-section of the shaft 34 is illustrated as being generally round, the cross-section can be a different shape, such as square, oval, triangular, etc.

The latch 36 comprises a housing 52. The housing 52 comprises a pair of opposing walls 54*a*, 54*b* that located on opposite sides of an opening 56. Each of the walls 54*a*, 54*b* comprises a respective slot 58*a*, 58*b* (See also FIG. 4). Each of the slots 58*a*, 58*b* extend along an axis 60. The axis 60 is angled relative to the axis 50 of the shaft 34. The angle of the slots 58*a*, 58*b* may be determined based on the amount that the latch 36 is to be moved in the fourth direction 88 (FIG. 5B) to open or raise the tonneau cover 16 or in the second direction 84 (FIG. 5A) to close or lower the tonneau cover 16. The angle of the axis 60 relative to axis 50 of shaft 34 may be on the order of about 20 degrees or more, 30 degrees or more, 45 degrees or more, 60 degrees or more, 75 degrees or more, etc. The angle may be determined based on how much the latch 36 and/or finger 62 is to move during opening and/or closing of the tailgate. That is, a larger or steep angle of axis 60 relative to axis 50 may provide for the tonneau cover to open more compared to a smaller or less-steep angle of axis 60 relative to axis 50.

The latch 36 comprises a finger 62. The finger 62 is adapted to engage the tonneau cover 16 (FIGS. 1 and 2). The finger 62 may be adapted to engage, or be connected to, or attached to, any suitable portion of the tonneau cover 16. For example, the finger 62 may be adapted to engage or connect to a supporting rail or connector that extends on an underside 90 or top side of the tonneau cover 16 (in a cross-car vehicle direction and/or a fore-aft vehicle direction); a top side of the tonneau cover 16 (e.g., an A-surface of the cover 16), a side or edge of the tonneau cover 16; etc.

The latch 36 and/or finger 62 may be flexible or moveable so that after the tonneau cover 16 is moved into the open or raised configuration, the latch 36 or finger 62 can be disconnected or moved out of engagement with the tonneau cover 16 so that the tonneau cover 16 can be furthered raised or opened. Similarly, when moving the tonneau cover 16 from an open or raised configuration into a lowered or closed configuration, the assembly 24, latch 36, or finger 62 is moveable so that the assembly 24, latch 36, or finger 62 can again be connected thereto.

Figure 4:
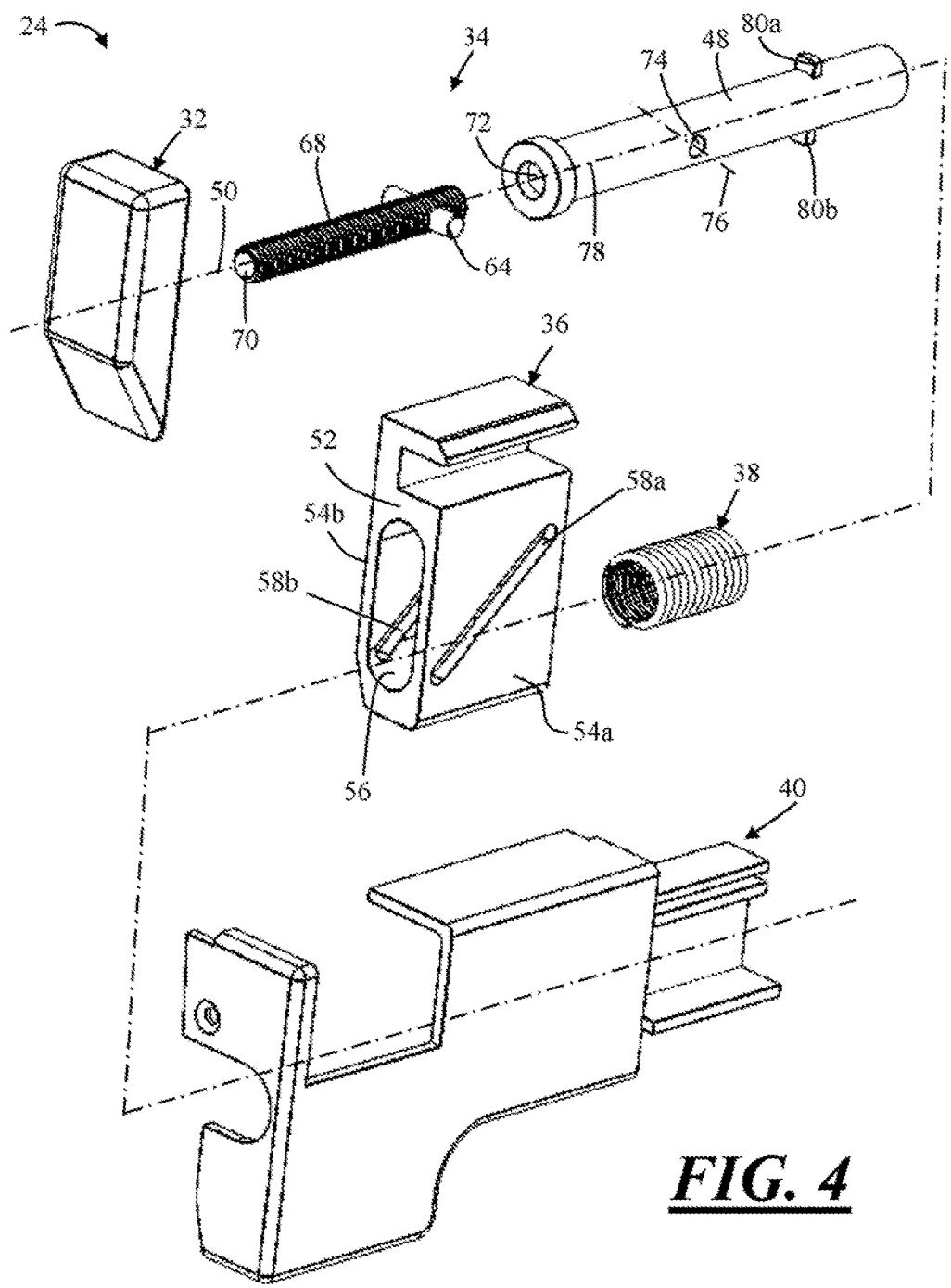
FIG. 4 is an exploded view of the striker assembly.

FIG. 4 illustrates the striker assembly 24. In addition to the elongated member 48, the shaft 34 comprises a rod 68. At its first end 70, the rod 68 is adapted to attach or connect to the plate 32, At or near an opposing end, the rod 68 comprises the pin 64. The rod 68 may be threaded connected to the plate 32 so that a position or distance between the plate 32 and the latch 36 and/or the rest of the assembly 24 can be adjusted. This may be desirable to take up manufacturing and/or assembly variations in the positioning of the assembly 24 in the vehicle 10. In some configurations, however, the rod 68 may be eliminated, and the elongated member 48 may be connected to the plate 32, and the elongated member 48 may include the pin 64.

Figure 5A:
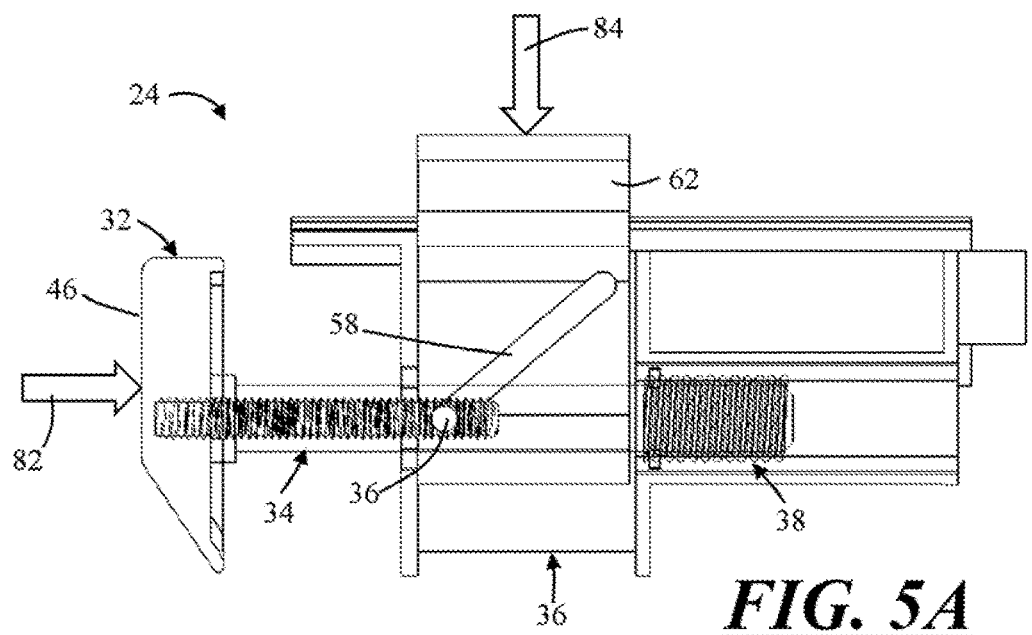
FIG. 5A is side view of the striker assembly in an open or unlocked configuration.
Figure 5B:
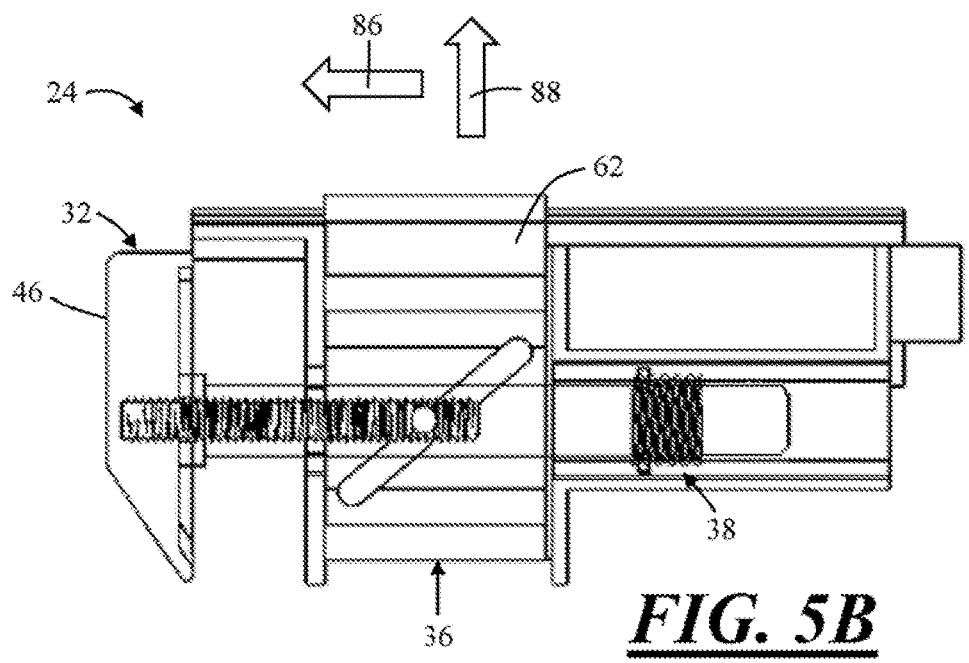
FIG. 5B is side view of the striker assembly in a closed or locked configuration.

The elongated member 48 comprises a first bore 72 and a second bore 74. An axis 76 of the second bore 74 is generally perpendicular to the axis 78 of the second bore 72. The rod 68 is received in the first bore 72 such that the pin 64 is aligned with and extends through the second bore 74. The pin 64 is adapted to engage slots 58*a*, 58*b* in the latch 36 can cause the latch 36 to move in a second and fourth direction (FIGS. 5A and 5B). In order to reduce friction therebetween, the pin 64 may comprise a suitable bearing.

The elongated member 48 comprises a pair of retaining tabs 80*a*, 80*b* that are adapted to engage and connect the spring 38 to the elongated member 48. The tabs 80*a*, 80*b* are arranged on the elongated member 48 approximately 90 degrees offset relative to the pin 64 and the second bore 74. Other offsets may be desirable, however. For example, the tabs 80*a*, 80*b* can be angularly offset relative to the pin 64 and bore 74 by less than 90 degrees, less than 75 degrees, less than 45 degrees, less than 30 degrees, or even have 0 degrees offset. Moreover, while the FIGS. illustrate two engagement tables, it is understood that any suitable number of engagement tabs may be used. For example, the engagement tab may be arranged as one solid projection that extends 360 degrees around an outer diameter of the elongated member 48. For example, there may be three or more engagement tabs, four or more engagement tabs, six or more engagement tabs, nine or more engagement tabs, etc.

The housing 52 of the latch 36 comprises the opposing walls 54*a*, 54*b* that are located on opposite sides of the opening 56. Each wall 54*a*, 54*b* comprises a respective slot 58*a*, 58*b*.

FIG. 5A illustrates the assembly 24 in an unlocked or open configuration, and FIG. 5B illustrates the assembly 24 in a locked or closed configuration. The unlocked or open configuration corresponds to the tonneau cover 16 being in an at least partially open or raised configuration. The locked or closed configuration corresponds to the tonneau cover 16 being in a closed or lowered configuration.

When a force is applied on the face or surface 46 of the plate 32 in a first direction 82, the plate 32 is moved in the first direction 82. This means that the force is adapted to move the plate 32 closer to the latch 36 from its position illustrated FIG. 5A to the position illustrated in FIG. 5B. The force may be applied onto the face or surface 46 of the plate 32 by way of raising or closing the tailgate 14. That is, as the tailgate 14 is moved from the open or lowered position illustrated in FIG. 2 to the closed or raised position illustrated in FIG. 1, the tailgate 14 may contact the plate, and then displace or move the plate 32 in the first direction 82.

Because the shaft 34 is connected to the plate 32, as the plate 32 is moved in the first direction 82, the shaft 34 is also moved in the first direction 82. As the shaft 34 is moved in the first direction 82, the latch 36 is correspondingly moved in the second direction 84, which is generally perpendicular to the first direction 82. That is, by way of the attachment of the pin 36 to the slots 58, movement of the shaft 34 in the first direction 82 causes the latch 36 to be pulled downward in the second direction 84 to the position of the latch 36 shown in FIG. 5B. Because the finger 62 is connected or attached to the tonneau cover 16, movement of the latch 36 downward in the second direction 84 causes the tonneau cover 16 to be moved, or pulled, or brought down into the closed or lowered position, which may be a position where the inside surface 90 of the tonneau cover 16 is in contact with or close to the top edge 18 of the cargo box 12 and/or the top edge 22 of the tailgate 14.

Because the assembly 24 allows for closing or raising the tailgate 14 with the tonneau cover 16 at least partially spaced apart from the top edge 22 of the tailgate 14 and/or the top edge 18 of the cargo box 12, reduction or elimination of friction, contact, drag, and/or or sticking between the tonneau cover 16 and a tailgate 14 when closing or raising the tailgate 14 is realized. This may advantageously provide for closing or raising the tailgate 14 with lower a force and/or prevent damage to either or both of the tonneau cover 16 and tailgate 14.

Moreover, because the assembly 24 functions to lower or lock the tonneau cover 16 after the tailgate 14 is moved into a closed or raised position, the tonneau cover 16 is automatically closed or locked in single step with raising or closing the tailgate 14. This advantageously removes a step of having to manually close or lower or lock a tonneau cover 16 before or after the tailgate 14 is raised or closed.

Movement of the shaft 34 in the first direction 82 also causes the spring 38 to compress from the position shown in FIG. 5A to the position shown in FIG. 5B.

When the force is removed from the face or surface 46 of the plate 32, the spring 38 is uncompressed from its position in FIG. 5B back to its position in FIG. 5A. The reaction force from uncompressing the spring 38 causes the shaft 34 to be moved in a third direction 86. As the shaft 34 is moved in the third direction 86, the latch 36 is moved in a fourth direction 88, which is generally perpendicular to the third direction 86. That is, by way of the attachment of the pin 36 to the slots 58, movement of the shaft 34 in the third direction 86 causes the latch 36 to be pushed upwards in the fourth direction 88 to the position shown in FIG. 5A. Because the finger 62 is connected or attached to the tonneau cover 16, movement of the latch 36 upward in the fourth direction 88 causes the tonneau cover 16 to be moved, or pushed, or displaced into the open or raised position, which may be a position where the inside surface 90 of the tonneau cover 16 is at least partially spaced away from the top edge 18 of the cargo box 12 and/or the top edge 22 of the tailgate 14.

Because the assembly 24 allows for opening or lowering the tailgate 14 with the tonneau cover 16 at least partially spaced apart from the top edge 22 of the tailgate 14 and/or the top edge 18 of the cargo box 12, reduction or elimination of friction, contact, drag, and/or or sticking between the tonneau cover 16 and a tailgate 14 when opening or raising the tailgate 14 is realized. This may advantageously provide for opening or raising the tailgate 14 with lower a force and/or prevent damage to either or both of the tonneau cover 16 and tailgate 14.

Moreover, because the assembly 24 functions to raise or unlock the tonneau cover 16 as the tailgate 14 is moved into the opened or raised position, the tonneau cover 16 is automatically opened or unlocked in single step with lowering or opening the tailgate 14. This advantageously removes a step of having to manually open or raise or unlock a tonneau cover 16 before or after the tailgate 14 is opened or lowered.

While it has been described that the force applied on the face or surface 46 of the plate 32 is provided by closing or raising the tailgate 14 into the closed or raised position, the force can be applied on the plate 32 in other ways. For example, the assembly 24 may also include a cylinder or piston that is adapted to move the plate 32 in the first direction 82 by pressing or releasing a button on a keypad or remote.

Similarly, in place of the spring, or in addition to the spring, the assembly 24 may include a motor, a motor and gear rack, a piston, a linear bearing, or a combination thereof that is adapted to move the plate 32 in the third direction 86 to open the tonneau cover by pressing or releasing a button on a keypad or remote, or when the tailgate latch is manipulated, for example.

While the tonneau cover 16 illustrated in FIG. 2 is a hard-fold tonneau cover, it is understood that the tonneau cover 16 may be any suitable tonneau cover. For example, the tonneau cover can be a roll-type tonneau cover that can be rolled into an open configuration and unrolled into a closed configuration. The tonneau cover can be a soft or a hard folding tonneau cover.

Moreover, while the tonneau cover 16 is described as being move upwards away from the top edge 18 of the 18 of the cargo box 12 and/or top edge 22 of the tailgate 14 when the latch 36 is moved from the position illustrated in FIG. 5B to the position illustrated in FIG. 5A, the assembly 24 may instead at least partially retract the tonneau cover in a direction of the cab of the vehicle 10 in the case of a roll-type or retractable tonneau cover.

LISTING OF REFERENCE NUMERALS 10 vehicle
12 cargo box
14 tailgate
16 tonneau cover
18 top edge of cargo box 12
20 inside of cargo box 12
22 top edge of tailgate 14
24 striker assembly
26 fender
28 inside panel
30 fender
32 plate
34 shaft
36 latch
38 spring
40 cover
42 aperture in cover
44 aperture in cover
46 face or surface
48 elongated member
50 longitudinal axis of elongated member
52 housing
54 walls of housing 56 opening in housing
58 slots in housing
60 axis of sot
62 finger of latch
64 pin
68 rod
70 first end of rod
72 first bore of elongated member
74 second bore
76 axis of second bore
78 axis of first bore
80 retaining tabs
82 first direction
84 second direction
86 third direction
88 fourth direction
90 inside surface

The invention claimed is:

1. An assembly for moving a tonneau cover, the assembly comprising:
   i) a plate;
   ii) a latch in communication with the plate, the latch is adapted to engage the tonneau cover; the latch comprises a slot; and
   iii) a shaft connected to the plate at one end, the shaft comprises a pin that is adapted to engage the slot;
   wherein movement of the plate in a first direction causes the pin to slide in the slot so that the latch moves the tonneau cover into an at least partially closed configuration.

2. The assembly according to claim 1, wherein the assembly comprises:
   iv) a spring that is adapted to be compressed during movement of the plate in the first direction.

3. The assembly according to claim 1, wherein the latch comprises a housing having an opening defined by opposing walls, the shaft is received through the opening, and the slot comprises opposing slots each one of which are defined in one of the opposing walls.

4. The assembly according to claim 1, wherein the slot extends along an axis that is at a slant relative to the first direction.

5. The assembly according to claim 1, wherein the latch comprises a housing, the housing has an opening through which the shaft extends and an engagement feature for engaging the tonneau cover.

6. The assembly according to claim 5, wherein the engagement feature is C-shaped.

7. The assembly according to claim 5, wherein the housing comprises two slots that are engaged by the pin and slanted relative to the first direction.

8. A vehicle comprising the assembly according to claim 1.

9. The vehicle according to claim 8, wherein the vehicle comprises a tailgate, and the plate is configured to be moved in the first direction during movement of the tailgate.

10. The vehicle according to claim 8, wherein the vehicle comprises a fender, and the assembly is attached to the fender.

11. The vehicle according to claim 10, wherein the vehicle comprises a tailgate, and the plate is configured to be moved in the first direction during closing of the tailgate, and the plate is configured to be moved in another direction during opening of the tailgate.

12. An assembly for moving a tonneau cover, the assembly comprising:
   i) a plate;
   ii) a latch in communication with the plate, the latch comprises a housing having an opening and one or more slots, the latch comprises a finger that is adapted to engage the tonneau cover,
   iii) a shaft that is connected to the plate, the shaft comprises a pin that is adapted to engage the one or more slots, the shaft is received through the opening in the latch; and
   iv) a spring that is engaged by the shaft,
   wherein movement of the plate and the shaft in a first direction causes the pin to slide in the one or more slots so that the latch to moves the tonneau cover into an at least partially closed configuration,
   wherein during the movement of the shaft in the first direction the spring is compressed; and
   wherein uncompressing the spring causes the latch to move the tonneau cover into an at least partially open configuration.

13. The assembly according to claim 12, wherein the plate is adapted to be moved in the first direction by at least partially closing a tailgate, and the plate is adapted to be moved in another direction after the tailgate is at least partially opened.

14. An assembly comprising:
   i) a plate; and
   ii) a latch in communication with the plate, the latch is adapted to engage a tonneau cover,
   wherein movement of the plate in a first direction causes the latch to move in a second direction, which causes the tonneau cover to move, and
   wherein movement of the plate in a third direction causes the latch to move in a fourth direction, which causes the tonneau cover to move.

15. The assembly of claim 14, wherein the assembly comprises:
   iii) a shaft, the shaft is connected to the plate, and the shaft comprises a pin that is adapted to engage a slot defined in the latch.

16. The assembly according to claim 15, wherein the assembly comprises:
   iv) a spring that is engaged by the shaft,
   wherein movement of the plate in the first direction causes the spring to compress, and uncompressing the spring causes the plate to move in the third direction.

17. The assembly according to claim 16, wherein the shaft comprises a pair of engagement tabs that are adapted to engage the spring.

18. The assembly according to claim 17, wherein the latch comprises a housing, the housing comprises opposing walls defining an opening between the walls, the shaft is adapted to be received through the opening, and the slot comprises opposing slots each of which are defined in the opposing walls.

19. The assembly according to claim 14, wherein the latch comprises a C-shaped feature that is adapted to engage the tonneau cover.

20. The assembly according to claim 14, wherein the plate is adapted to be moved in the first direction by at least partially closing a tailgate, and the plate is adapted to be moved in the third direction when the tailgate is at least partially opened.

* * * * *